3,759,678
REFORMER CATALYST
Bertrand L. Chamberland, Storrs, Conn., and Eric J. Hoag, Charleston, W. Va., assignors to E. I. du Pont de Nemours and Company, Wilmington, Del.
No Drawing. Filed Apr. 8, 1971, Ser. No. 132,608
Int. Cl. C01b 2/14
U.S. Cl. 48—214      1 Claim

ABSTRACT OF THE DISCLOSURE

Nickel catalysts, often supported on alumina, are used in primary and secondary reformers for the steam reforming of hydrocarbons. If such catalysts contain less than 30 p.p.m. maximum sodium or potassium or both, the problem of the fouling of waste heat boilers is alleviated.

BACKGROUND OF THE INVENTION

Catalytic steam-hydrocarbon reforming is the major method employed by industry for producing hydrogen and synthesis gas mixtures. In this process gaseous hydrocarbons, such as methane and ethane, or other hydrocarbons which may be vaporized at moderate temperatures, such as propane, butane, and other normally liquid hydrocarbons up to and including heptane and octane are reacted with steam over a nickel catalyst at 650°–1000° C. to produce carbon oxides and hydrogen. The primary reaction products are then processed further in various ways, depending on the final use for the hydrogen or synthesis gas produced and on the purity required. Most often the gases produced are used for ammonia and methanol synthesis.

The catalysts which are commercially available for use in manufacturing plants using the steam-hydrocarbon reforming process generally contain 10 to 50% nickel oxide mixed with a refractory, usually alumina or zirconia, and a cement such as calcium aluminate. The catalyst is generally pelleted into cylinders 0.5 or 0.75 in. in diameter and length, or as Raschig rings of similar size. These pellets or rings are placed in tubes located in a heating furnace.

In these reforming processes the waste heat generated during the process is recovered in high pressure steam generators, i.e., waste heat boilers. There is presently a problem in the art as these waste heat boilers are subject to fouling by deposits. These deposits act as insulation and result in undesired reduction of heat transfer. When the walls or tubes of the waste heat boiler are new, the exit gas temperature is about 480–500° C., however once they have been fouled, the temperature reaches 550–560° C. If the temperatures become too high, the gas flow rates must be reduced.

One solution in the art to this problem was the use of water and steam sparging to erode or thermally shock the deposits off of the boiler walls or tubes. However, to be effective a continuous sparge is necessary and even then only a small length of the tubes can be subjected to direct sparging.

SUMMARY OF THE INVENTION

We have discovered that the deposits that foul the waste heat boilers is nepheline, $Na_3KAl_4Si_4O_{16}$. We have further discovered that the formation of these nepheline deposits can be reduced or essentially eliminated by using a nickel on alpha alumina, mullite or zirconia catalyst containing less than 30 p.p.m. of potassium or sodium.

Although the applicants do not desire to be bound to any particular theory, it is believed that the sodium and potassium normally present in reforming catalysts propagate the vapor phase transort of alumina-silicates to the boiler walls.

The low potassium or sodium catalysts useful in the process of the invention can be obtained by the proper selection of the raw materials used to make the catalysts and/or by preparing the catalysts using distilled or deionized water.

DETAILED DESCRIPTION OF THE INVENTION

The steam reforming of hydrocarbon over nickel catalysts is well known in the art.

In the primary reforming process, a desulfurized hydrocarbon, e.g., natural gas, at pressures of 250 to 400 p.s.i.g. is preheated to about 520° C., mixed with superheated steam and passed through a nickel-base catalyst. The catalyst is contained in tubes heated externally to about 850° C. in the primary reformer.

Within the primary reformer tubes the following reactions occur between the natural gas and steam:

$$CH_4 + H_2O \rightleftharpoons CO + 3H_2$$

$$CH_4 + 2H_2O \rightleftharpoons CO_2 + 4H_2O$$

These reactions are endothermic and require the application of a considerable amount of heat. An exothermic reaction also occurs in the reformer:

$$CO + H_2O \rightleftharpoons CO_2 + H_2$$

The effluent from the primary reformer consists of hydrogen, carbon monoxide, carbon dioxide, excess steam and unconverted hydrocarbon. This effluent is fed to a secondary reformer and then to the waste heat boilers to recover useful heat; the gases entering the waste heat boiler are at about 950–960° C. and at a pressure of 400 to 440 p.s.i.g. The gases exit at temperatures of 480 to 560° C. and are fed to other units such as a shift converter, scrubber, methanator, compressor, synthesis converter, etc. depending on the desired product.

The process of the invention does not require any changes in the conventional reforming process of the art. The conventional operating parameters of these processes can be used without change; thus, no change in the conventional steam to carbon ratio, pressures, temperatures or other operating conditions is required. Those skilled in the art can easily adapt the process of the invention to any conventional reforming process.

All that is required is that the nickel on alpha alumina, mullite, or zirconia catalyst used in the primary and secondary reformers contain less than 30 p.p.m. of sodium or potassium.

This critical feature can be obtained by the selection of sodium or potassium free raw materials and/or the use of distilled or deionized water in making the catalyst.

If the catalyst contains a cement, e.g., calcium aluminate, Sorel cement, etc., sodium can be present in the calcium and aluminum silicate raw materials. The support, e.g., alumina, is also a source of the undesired sodium or potassium. Thus care must be exercised in the selection of these materials as well as the raw materials for the active catalyst.

Thus the catalysts can be made by conventional techniques, such as impregnating the refractory support, i.e., alumina, mullite or zirconia with a solution of the catalytic active ingredient, i.e., nickel and then calcining to activate. The temperature of calcining is not critical and can vary from 650° to 1200° C.

The catalyst can also be made by adding a cement to the catalytically active nickel and cementing them to the support. Useful cements include Sorel cement, calcium aluminate, alumina gel, colloidal alumina, and the like.

Alternatively, the catalysts can be made by coprecipitation of the catalytic components, with the support materials. The co-precipitation is brought about by preparing a solution of the catalytic component and support and then adding a precipitating agent to the solution, e.g., ammonium carbonate, ammonia, ammonium oxalate and the like. The precipitated product can be mixed with a suitable adhesive, i.e., nickel nitrate, colloidal silica sol, alumina gel, colloidal boehmite and then pilled or extruded into the desired form. This form can vary widely and will usually be in the shape of rods, tubes, saddles, etc.

The catalyst can contain in addition promoters and stabilizer. Thus it can contain a ratio of one part nickel to 100 parts stabilizer or promoter of any of the following materials; rhenium, uranium oxide, chromium oxide, lanthanum oxide, alumina, zirconium oxide, praseodymium oxide, thorium oxide, barium oxide, silica, titania, cerium oxide, strontium oxide, calcium oxide, magnesium oxide, manganese oxide, individual or mixed rare earth oxides, or nickel chromite. The only limitation is that these materials do not add sufficient sodium or potassium to exceed the 30 p.p.m. limitation.

The following examples are offered to illustrate the invention.

(1) A solution is prepared by dissolving 25 parts by weight of pure nickel nitrate hexahydrate in 50 parts by weight of distilled water, the water containing less than 30 p.p.m. sodium or potassium.

(2) 200 parts by weight is weighed out of alpha-alumina in the form of $\frac{1}{8}''$ x $\frac{1}{8}''$ right cylinders having a surface area of approximately 1 m.$^2$/g., an apparent density of 1.1 g./ml., a total pore volume of 0.4 ml./g. and pore dimensions largely in the $\frac{1}{2}$ micron to 10 micron in diameter range. The alpha alumina did not contain sodium or potassium.

(3) The support obtained in item (2) above was heated to 80° C. in an evaporating dish or suitable open-mouth container. Then the solution obtained in item (1) was poured over the support and evaporated to dryness at 110° C. with constant stirring.

(4) The uniformly coated support is then calcined at 1000° C. for 3 hours.

The catalyst thus produced is effective for the reforming of a steam-natural gas mixture comprising a ratio of 3.5 steam to 1 natural gas at temperatures in excess of 650° C. and at space velocities as high as 2000 reciprocal hours relative to the methane feed, and nepheline deposits do not form in the waste heat boilers.

We claim:

1. In the process of reforming hydrocarbons with steam over alpha alumina, mullite, or zirconia supported nickel catalysts to produce synthesis gas, the improvement wherein said hydrocarbon and steam are reacted over a nickel on alpha alumina, mullite or zirconia catalyst containing less than 30 p.p.m. of sodium or potassium in primary and secondary reformers, the synthesis gas thus produced is then fed through the tubes of waste heat boilers and the tubes of said boilers remain essentially free from deposits of nepheline.

References Cited

UNITED STATES PATENTS

| | | | |
|---|---|---|---|
| 3,222,132 | 12/1965 | Dowden | 48—214 U X |
| 3,432,443 | 3/1969 | Davies et al. | 48—214 X |
| 3,574,578 | 4/1971 | Franz et al. | 48—214 |
| 3,582,296 | 6/1971 | Umano et al. | 48—214 |

MORRIS O. WOLK, Primary Examiner

R. E. SERWIN, Assistant Examiner

U.S. Cl. X.R.

48—197 R; 252—466